United States Patent
Sato

(10) Patent No.: US 10,194,371 B2
(45) Date of Patent: Jan. 29, 2019

(54) COMMUNICATION APPARATUS AND CONTROL METHOD OF COMMUNICATION APPARATUS

(71) Applicant: CANON KABUSHIKI KAISHA, Tokyo (JP)

(72) Inventor: Ryosuke Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 82 days.

(21) Appl. No.: 14/831,298

(22) Filed: Aug. 20, 2015

(65) Prior Publication Data

US 2016/0066248 A1    Mar. 3, 2016

(30) Foreign Application Priority Data

Sep. 1, 2014    (JP) ................. 2014-177431

(51) Int. Cl.
*H04L 12/28*    (2006.01)
*H04W 40/22*    (2009.01)
(Continued)

(52) U.S. Cl.
CPC ........... *H04W 40/22* (2013.01); *H04W 76/10* (2018.02); *H04W 8/005* (2013.01); *H04W 8/24* (2013.01);
(Continued)

(58) Field of Classification Search
CPC ..... H04W 12/08; H04W 56/00; H04W 76/02; H04W 88/08; H04W 4/00; H04W 40/02;
(Continued)

(56) References Cited

U.S. PATENT DOCUMENTS 7,778,623 B2     8/2010 Araki et al.
8,271,582 B2 *   9/2012 Okita ................... G06F 9/5027
                                                        370/346
(Continued)

FOREIGN PATENT DOCUMENTS

CN     102648458 A    8/2012
CN     102843434 A    12/2012
(Continued)

OTHER PUBLICATIONS

Extended European Search Report—Application No. 15002511.2 dated Jan. 28, 2016.

(Continued)

*Primary Examiner* — Hanh N Nguyen
(74) *Attorney, Agent, or Firm* — Venable LLP

(57) ABSTRACT

A communication apparatus includes one or more computers, with each computer having a memory for storing instructions and a processor for executing the instructions to obtain status information which indicates whether a relay function of a first apparatus, different from the communication apparatus, which uses a first wireless communication method is valid or not, using a second wireless communication method, and to request, using the second wireless communication method, the first apparatus to start the relay function, in a case where the obtained status information indicates that the relay function is valid. In addition, data for communicating with a second apparatus, different from the communication apparatus, connected via the first apparatus is communicated with the first apparatus using the first wireless communication method, in a case where the first apparatus is requested to start the relay function.

9 Claims, 11 Drawing Sheets

(51) Int. Cl.
*H04W 76/10* (2018.01)
*H04W 8/00* (2009.01)
*H04W 84/12* (2009.01)
*H04W 84/18* (2009.01)
*H04W 88/04* (2009.01)
*H04W 88/06* (2009.01)
*H04W 8/24* (2009.01)

(52) U.S. Cl.
CPC .......... *H04W 84/12* (2013.01); *H04W 84/18* (2013.01); *H04W 88/04* (2013.01); *H04W 88/06* (2013.01)

(58) Field of Classification Search
CPC ........ H04W 76/10; G06F 9/5027; G06F 7/04; H04L 63/1416; H04L 67/2861; H04L 67/10; H04L 29/06
See application file for complete search history.

(56) References Cited

U.S. PATENT DOCUMENTS

| | | | | |
|---|---|---|---|---|
| 8,494,442 | B2 | 7/2013 | Sato | H04B 7/15 |
| 8,943,554 | B2* | 1/2015 | Tran | H04L 63/1416 |
| | | | | 726/1 |
| 8,971,849 | B2* | 3/2015 | Bhatia | H04W 12/08 |
| | | | | 370/229 |
| 9,414,338 | B2* | 8/2016 | Cai | H04W 56/00 |
| 9,713,174 | B2* | 7/2017 | Kuehnel | H04W 76/10 |
| 2011/0040900 | A1 | 2/2011 | Yepez et al. | |
| 2012/0030735 | A1 | 2/2012 | Sato | 726/5 |
| 2013/0148568 | A1* | 6/2013 | Iimori | H04W 40/02 |
| | | | | 370/315 |
| 2013/0171964 | A1 | 7/2013 | Bhatia et al. | |
| 2013/0331028 | A1 | 12/2013 | Kuehnel et al. | |
| 2014/0127992 | A1 | 5/2014 | Kuscher et al. | 455/41.1 |
| 2014/0215048 | A1 | 7/2014 | Nakajima | |
| 2015/0188991 | A1* | 7/2015 | Huang | H04L 67/2861 |
| | | | | 709/217 |

FOREIGN PATENT DOCUMENTS

| | | | | |
|---|---|---|---|---|
| CN | 103428283 | A | 12/2013 | |
| EP | 2 688 359 | | 1/2014 | ............ H04W 84/22 |
| EP | 2757837 | A1 | 7/2014 | |
| GB | 2 472 698 | | 2/2011 | ............ G06F 13/10 |
| JP | 2007-235197 | A | 9/2007 | |
| JP | 2011039793 | A | 2/2011 | |
| JP | 2012-227610 | A | 11/2012 | |
| JP | 2014-027439 | A | 2/2014 | |
| KR | 10-2013-0060072 | A | 6/2013 | |
| WO | 2014/129153 | | 8/2014 | ............ H04W 84/18 |

OTHER PUBLICATIONS

Specification of the Bluetooth System, vol. 2, Version 1.1, Feb. 22, 2001, pp. 1-452, XP17620837A.
Bluetooth Personal Area Networking Profile, Version 1.0, Feb. 14, 2006, pp. 1-65, XP003012348.
Bluetooth SIG, Specification of the Bluetooth System (ver. 4.0) https://www.bluetooth.org/en-us/specification/adopted-specifications.
European Office Action dated Aug. 3, 2017, in related European Patent Application No. 15002511.2.
Chinese Office Action dated Dec. 14, 2017, in corresponding Chinese Patent Application No. 201510526310.1 (with English translation).
Japanese Office Action dated Apr. 27, 2018, in corresponding Japanese Patent Application No. 2014-177431.
Korean Office Action dated Jun. 25, 2018, in corresponding Korean Patent Application No. 10-2015-0118541.
Korean Official Action dated Dec. 11, 2017, in corresponding Korean Patent Application No. 10-2015-0118541.

* cited by examiner

FIG. 8

| # | DEVICE IDENTIFIER | STA FUNCTION | AP FUNCTION | TETHERING FUNCTION | AP EXECUTION STATE | TETHERING EXECUTION STATE |
|---|---|---|---|---|---|---|
| 1 | AAAAAAA | PRESENT | PRESENT | PRESENT | EXECUTABLE | EXECUTABLE |
| 2 | BBBBBBB | PRESENT | PRESENT | PRESENT | EXECUTABLE | INEXECUTABLE |
| 3 | CCCCCCC | PRESENT | ABSENT | ABSENT | – | – |

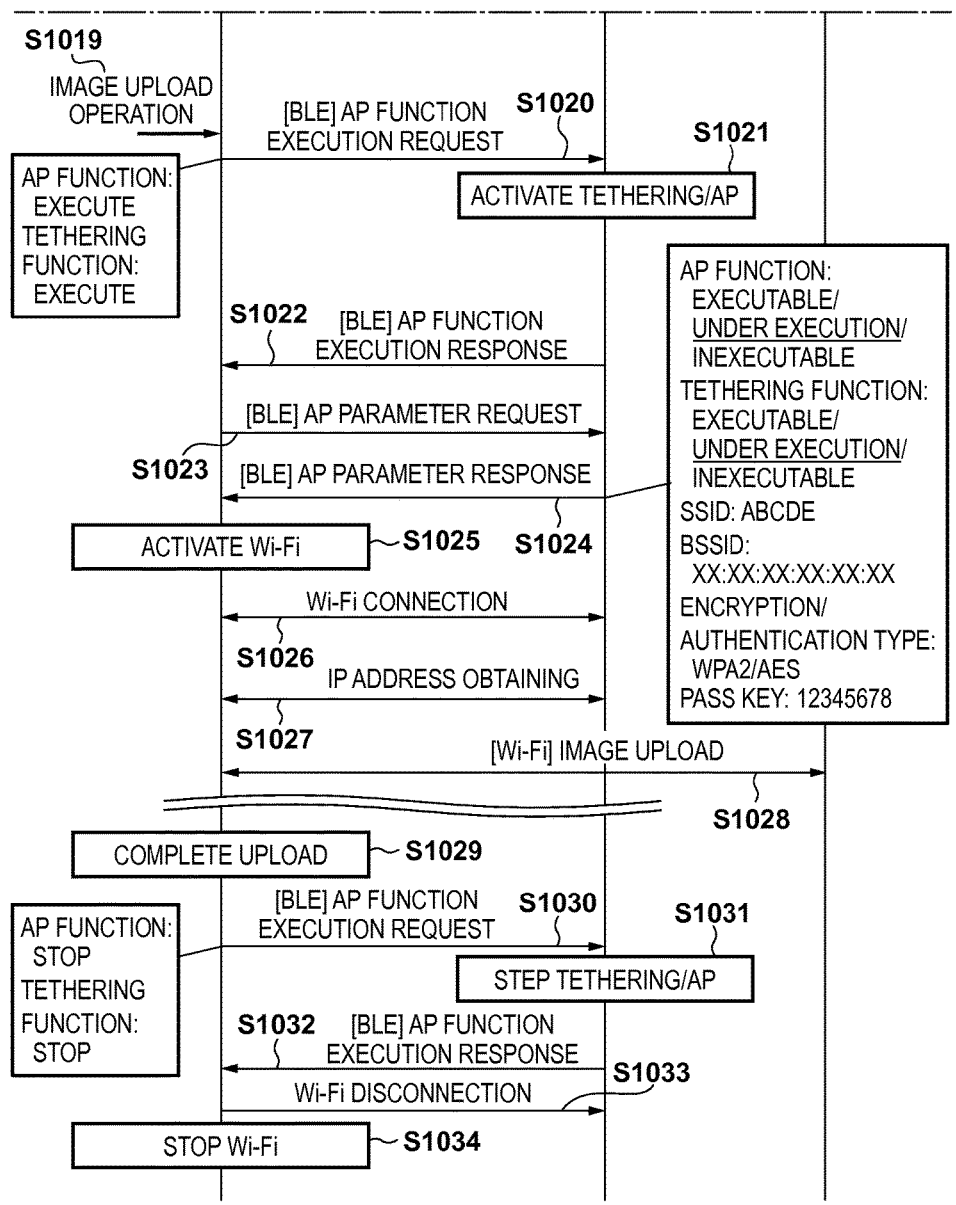

COMMUNICATION APPARATUS AND CONTROL METHOD OF COMMUNICATION APPARATUS

BACKGROUND OF THE INVENTION

Field of the Invention

The present invention relates to a communication apparatus and a control method of the communication apparatus.

Description of the Related Art

Recently, there exists many portable devices represented by a smartphone, which have a wireless LAN function and communicate with another wireless LAN device. In addition, a relay function called tethering, with which a device itself operates as an access point (AP) of wireless LAN and thus operates as a modem to another communication apparatus, has become widespread. There is disclosed a system that causes a smartphone to serve as an external relay apparatus and causes a digital camera to perform authentication processing of a cloud service (see Japanese Patent Laid-Open No. 2011-39793).

In addition, Bluetooth® Low Energy (to be referred to as BLE hereinafter) that allows communication with lower power consumption as compared to wireless LAN or version 3.0 or earlier has been standardized as part of Bluetooth 4.0 specifications (see Bluetooth SIG, SPECIFICATION OF THE BLUETOOTH SYSTEM (ver. 4.0)). In recent years, a smartphone that supports the BLE communication function has also become widespread, and a communication apparatus (for example, wristwatch) that communicates with a relay apparatus using BLE also exists.

However, such a smartphone cannot always execute the relay function (for example, tethering function). There exists, for example, a smartphone that does not implement the relay function, or a smartphone that implements the relay function but cannot use it by settings of a network carrier. In some cases, when a smartphone is connected to another access point (AP) as a client of wireless LAN and is performing communication, the relay function cannot be executed simultaneously.

In the above-described related art, however, when a communication apparatus requests to start the relay function, whether a smartphone serving as an external relay apparatus can execute the relay function is not taken into consideration. For this reason, the communication apparatus requests the smartphone incapable of executing the relay function to start the relay function, resulting in unnecessary communication traffic.

SUMMARY OF THE INVENTION

The present invention has been made in consideration of the above-described problem, and provides a technique of causing a communication apparatus that uses the relay function of an external relay apparatus to request an appropriate external relay apparatus to start the relay function and connecting the communication apparatus to a network, thereby reducing unnecessary communication traffic.

According to one aspect of the present invention, there is provided a communication apparatus comprising: a communication unit configured to communicate with a first other apparatus connectable to a second other apparatus; an obtaining unit configured to obtain status information which indicates that a relay function of the first other apparatus is valid or not using the communication unit; and a request unit configured to request, using the communication unit based on the status information, the first other apparatus to start the relay function.

According to one aspect of the present invention, there is provided a communication apparatus comprising: a first communication unit configured to perform wireless communication based on a first communication standard; a second communication unit configured to perform wireless communication based on a second communication standard different from the first communication standard, wherein power consumption of the wireless communication by the second communication unit is larger than that of the wireless communication by the first communication unit; an obtaining unit configured to obtain, from a first other apparatus via the first communication unit, status information representing whether a relay function of the first other apparatus is valid or not; a connection unit configured to connect the first other apparatus via the second communication unit, in a case where the status information represents that the relay function between the communication apparatus and a second other apparatus is valid, and not to connect to the first other apparatus via the second communication unit in a case where the status information represents that the relay function between the communication apparatus and the second other apparatus is not valid; and a request unit configured to request the first other apparatus to relay the second other apparatus in a case where the first other apparatus is connected by the connection unit.

According to one aspect of the present invention, there is provided a control method of a communication apparatus including a communication unit configured to communicate with a first other apparatus connectable to a second other apparatus, comprising: an obtaining step of obtaining status information which indicates that a relay function of the first other apparatus is valid or not using the communication unit; and a request step of requesting, using the communication unit based on the status information, the first other apparatus to start the relay function.

Further features of the present invention will become apparent from the following description of exemplary embodiments with reference to the attached drawings.

BRIEF DESCRIPTION OF THE DRAWINGS

FIG. 8 is a view showing a device table that manages the tethering executable state of a relay apparatus (smartphone) in the communication apparatus (digital camera) according to the embodiment of the present invention;

FIGS. 10A and 10B are sequence charts for exemplarily explaining a communication sequence between the communication apparatus (digital camera) and the relay apparatus (smartphone) according to the embodiment of the present invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

<1. Arrangement of Communication System>

In this embodiment, an example will be described in which a communication apparatus (for example, digital camera) obtains execution valid/invalid information (executable, under execution, inexecutable, or the like) of the relay function (for example, tethering function) of a relay apparatus (for example, smartphone) via a communication unit (for example, Bluetooth® Low Energy (BLE)), and requests a relay apparatus capable of executing the relay function to start the relay function. The communication apparatus is connected to an external server via the relay apparatus, and performs various kinds of processing such as image upload. The execution valid/invalid information is information which indicates that a relay function of the relay apparatus is valid or not.

Figure 9:
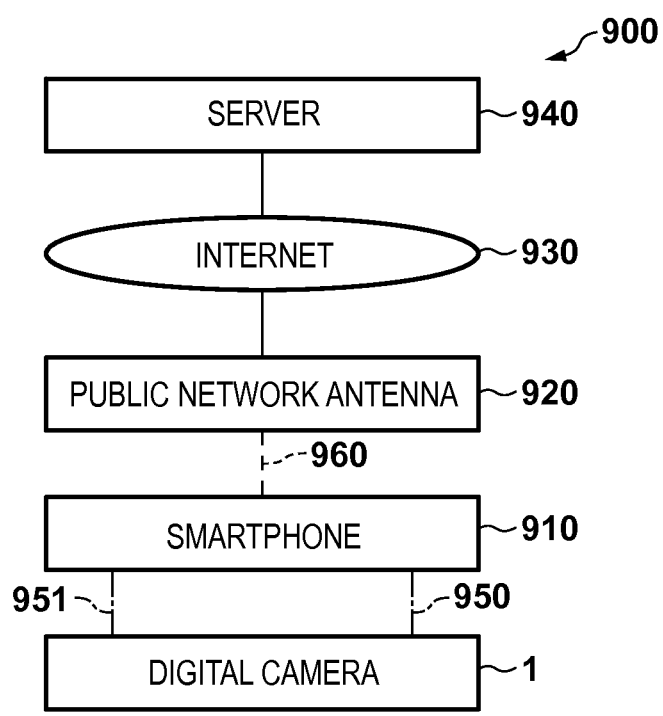
FIG. 9 is a block diagram showing the overall arrangement of a communication system according to the embodiment of the present invention.

An example of the arrangement of a communication system 900 according to an embodiment of the present invention will be described first with reference to FIG. 9. Referring to FIG. 9, a digital camera 1 is a communication apparatus according to this embodiment and is connectable to a smartphone 910 via BLE communication 950 and wireless LAN communication 951. A description will be made here assuming that the wireless LAN communication is wireless communication complying with the IEEE802.11 series standard. Power consumption associated with wireless communication is lower in the BLE communication 950 than in the wireless LAN communication 951. In other words, power consumption associated with wireless communication is higher in the wireless LAN communication 951 than in the BLE communication 950.

The smartphone 910 is connected to a public network antenna 920 via public network communication 960 and enables communication with the Internet 930. The smartphone 910 has a tethering function of transferring data between the wireless LAN communication 951 and public network communication 960. The digital camera 1 has a function of communicating with an external server 940 on the Internet 930 and uploading image/video data stored in the digital camera 1 to the external server 940 using the tethering function. The digital camera 1 can also communicate with a smartphone (not shown) other than the smartphone 910, which does not have the tethering function, via the BLE communication 950 or the wireless LAN communication 951.

<2. Hardware Arrangement of Communication Apparatus>

Figure 1:
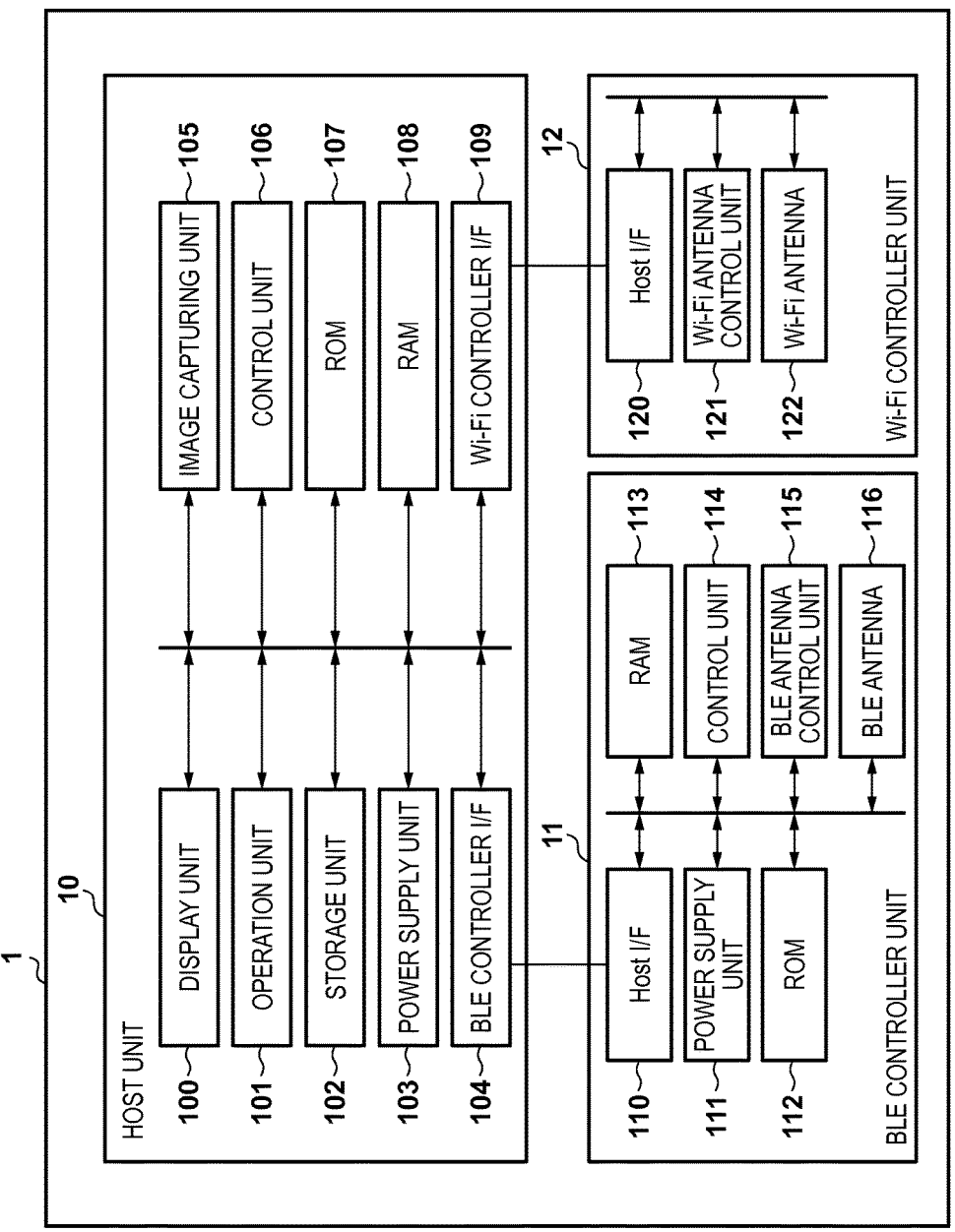
FIG. 1 is a block diagram showing an example of the hardware arrangement of a communication apparatus (digital camera) according to an embodiment of the present invention.

An example of the hardware arrangement of the communication apparatus (digital camera 1) according to the embodiment of the present invention will be described next with reference to FIG. 1.

The digital camera 1 includes a Host unit 10, a BLE controller unit 11, and a Wi-Fi controller unit 12.

The Host unit 10 includes a display unit 100, an operation unit 101, a storage unit 102, a power supply unit 103, a BLE controller I/F 104, an image capturing unit 105, a control unit 106, a ROM 107, a RAM 108, and a Wi-Fi controller I/F 109.

The display unit 100 and the operation unit 101, for example, display an application or accept an operation. The storage unit 102 stores and manages various kinds of data such as wireless communication network information, data transmission/reception information, and image data. The power supply unit 103 is, for example, a battery, and supplies power to the Host unit 10 and the Wi-Fi controller unit 12. The BLE controller I/F 104 is an interface connected to the BLE controller unit 11. The image capturing unit 105 takes a photo or video. The control unit 106 is, for example, a CPU, and controls the operation of each constituent element of the digital camera 1. The ROM 107 stores control instructions, that is, programs. The RAM 108 is used to temporarily save data or serves as a work memory when executing a program. The Wi-Fi controller I/F 109 is an interface connected to the Wi-Fi controller unit 12.

The BLE controller unit 11 includes a Host I/F 110, a power supply unit 111, a ROM 112, a RAM 113, a control unit 114, a BLE antenna control unit 115, and a BLE antenna 116.

The Host I/F 110 is an interface connected to the Host unit 10. The power supply unit 111 is, for example, a battery, and supplies power to the BLE controller unit 11. The ROM 112 stores control instructions, that is, programs, particularly, programs concerning BLE communication. The RAM 113 is used to temporarily save data or serves as a work memory when executing a program. The control unit 114 is, for example, a CPU, and controls the operation of each constituent element of the BLE controller unit 11. The BLE antenna control unit 115 controls the BLE antenna 116 and performs BLE communication.

When configured as described above, the BLE controller unit 11 can operate independently of the Host unit 10 and the Wi-Fi controller unit 12. That is, even when the power supply unit 103 stops power supply to the Host unit 10, the BLE controller unit 11 can be activated by power supply from the power supply unit 111 and communicate with an external communication apparatus by BLE.

The Wi-Fi controller unit 12 includes a Host I/F 120, a Wi-Fi antenna control unit 121, and a Wi-Fi antenna 122. The Host I/F 120 is an interface connected to the Host unit 10. The Wi-Fi antenna control unit 121 controls the Wi-Fi antenna 122 and performs wireless LAN communication.

<3. Functional Arrangement of Communication Apparatus>

Figure 2:
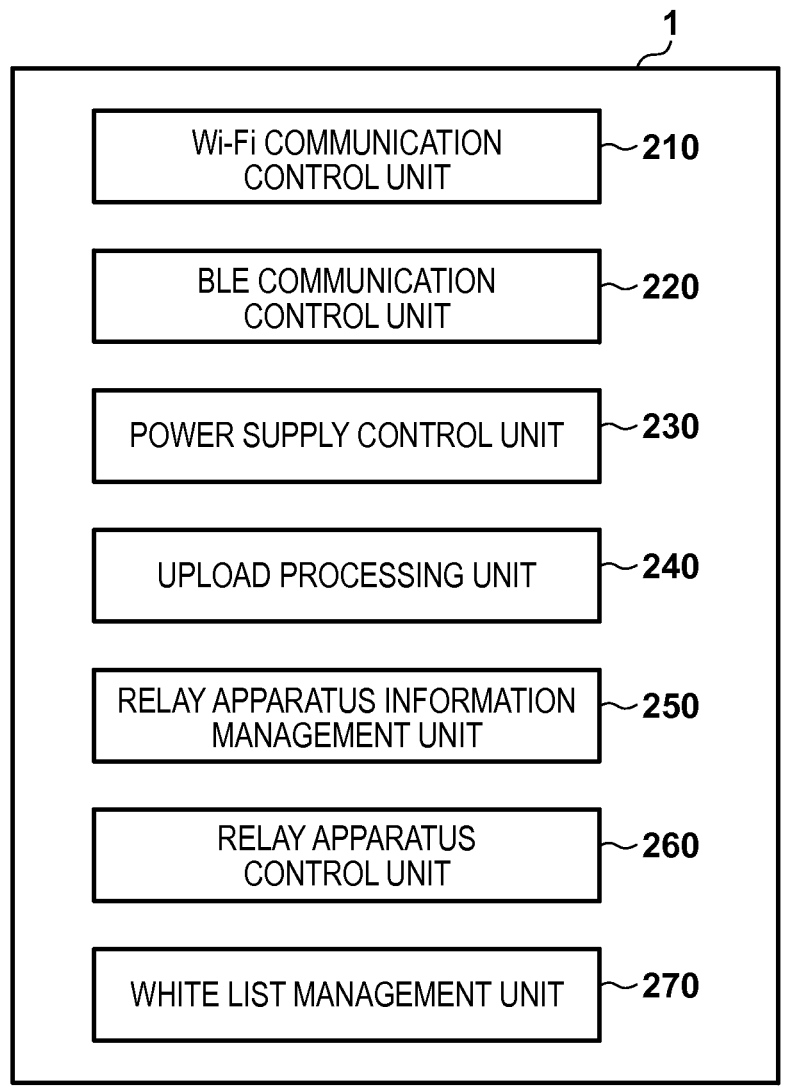
FIG. 2 is a block diagram showing an example of the functional block arrangement of the communication apparatus (digital camera) according to the embodiment of the present invention.

An example of the software configuration of the communication apparatus (digital camera 1) according to the embodiment of the present invention will be described next with reference to FIG. 2. Note that in this embodiment, the function of each functional block to be described below is executed as a software program. However, some or all of the functional blocks may be implemented as hardware.

The digital camera 1 includes a Wi-Fi communication control unit 210, a BLE communication control unit 220, a power supply control unit 230, an upload processing unit 240, a relay apparatus information management unit 250, a relay apparatus control unit 260, and a white list management unit 270.

The Wi-Fi communication control unit 210 controls wireless LAN communication via the Wi-Fi antenna control unit 121. Processing contents of the Wi-Fi communication control unit 210 are stored in the ROM 107 as a program, and the function of the Wi-Fi communication control unit 210 is executed when the control unit 106 executes the program.

The BLE communication control unit 220 controls BLE communication via the BLE antenna control unit 115. Processing contents of the BLE communication control unit 220 are stored in the ROM 112 as a program, and the function of the BLE communication control unit 220 is executed when the control unit 114 executes the program.

The power supply control unit 230 on/off-controls power supply by the power supply units 103 and 111. Processing contents of the power supply control unit 230 are stored in each of the ROMs 107 and 112 as a program, and the function of the power supply control unit 230 is executed when the control units 106 and 114 execute the program. The program to execute the processing of the power supply control unit 230 includes a program that operates in the control unit 106 and controls the power supply unit 111 and a program that operates in the control unit 114 and controls the power supply unit 103.

The upload processing unit 240 transfers image/video data stored in the storage unit 102 to the external server 940 via the Wi-Fi antenna control unit 121. Processing contents of the upload processing unit 240 are stored in the ROM 107 as a program, and the function of the upload processing unit 240 is executed when the control unit 106 executes the program.

The relay apparatus information management unit 250 manages the information of a relay apparatus connected via the BLE communication control unit 220. Processing contents of the relay apparatus information management unit 250 are stored in the ROM 107 as a program that operates a device management table (to be described later) stored in the RAM 108, and the function of the relay apparatus information management unit 250 is executed when the control unit 106 executes the program.

The relay apparatus control unit 260 requests a relay apparatus connected via the BLE communication control unit 220 to control the wireless LAN function and obtains information thereof. Processing contents of the relay apparatus control unit 260 are stored in each of the ROMs 107 and 112 as a program, and the function of the relay apparatus control unit 260 is executed when the control units 106 and 114 execute the program.

The white list management unit 270 manages a list (white list) of identifiers of external communication apparatuses stored in the RAM 113. Processing contents of the white list management unit 270 are stored in the ROM 112 as a program, and the function of the white list management unit 270 is executed when the control unit 114 executes the program. If the identifier of an external communication apparatus is recorded in the white list, the white list management unit 270 processes only BLE communication packets transmitted from the external communication apparatus, and discards other BLE communication packets. More specifically, the white list management unit 270 discards BLE communication connection request packets transmitted from an external communication apparatus that does not exist in the list, and rejects connection to the external communication apparatus by BLE communication. If the identifiers of external communication apparatuses are not recorded in the white list at all, the white list management unit 270 processes BLE communication packets transmitted from all external communication apparatuses.

A device management table managed by the relay apparatus information management unit 250 will be described here with reference to FIG. 8.

A device management table 800 is a management table that has a record for each relay apparatus. Each record includes items of a device identifier 810, an STA function 820, an AP function 830, a tethering function 840, an AP execution state 850, and a tethering execution state 860.

The device identifier 810 is an identifier for uniquely identifying a relay apparatus, and is formed from, for example, the Bluetooth address or MAC address of a relay apparatus. In addition, the device identifier 810 is a value that uniquely specifies a record in the device management table 800.

The STA function 820 is a value representing whether the relay apparatus specified by the device identifier 810 has a function of operating as a station of wireless LAN and provides a function of starting/stopping the station function from outside in accordance with a request by BLE communication. The AP function 830 is a value representing whether the relay apparatus specified by the device identifier 810 has a function of operating as an access point of wireless LAN and provides a function of starting/stopping the access point function from outside in accordance with a request by BLE communication. The tethering function 840 is a value representing whether the relay apparatus specified by the device identifier 810 has a tethering function via wireless LAN communication and provides a function of starting/stopping the tethering function from outside in accordance with a request by BLE communication. Each of the STA function 820, the AP function 830, and the tethering function 840 is represented by two values "present" and "absent".

The AP execution state 850 is a value representing the execution state of the access point function of a relay apparatus whose AP function 830 is "present". The AP execution state 850 is represented by three values "executable", "under execution", and "inexecutable". "Executable" represents a state in which the access point function is not executed in the relay apparatus, and it is possible to start the access point function from outside in accordance with a request by BLE communication. "Under execution" represents that the access point function is being executed in the relay apparatus. "Inexecutable" represents a state in which access point function is not executed in the relay apparatus, and it is temporarily impossible to start the access point function from outside in accordance with a request by BLE communication. For example, a state in which the relay apparatus is connected to another access point as a station of wireless LAN, and an application in the relay apparatus is performing communication corresponds to the "inexecutable" state. Additionally, the value of the AP execution state 850 is invalid in a relay apparatus whose AP function 830 is "absent".

The tethering execution state 860 is a value representing the execution state of the tethering function of a relay apparatus whose tethering function 840 is "present". The tethering execution state 860 is represented by three values "executable", "under execution", and "inexecutable". "Executable" represents a state in which the tethering function is not executed in the relay apparatus, and it is possible to start the tethering function from outside in accordance with a request by BLE communication. "Under execution" represents that the tethering function is being executed in the relay apparatus. "Inexecutable" represents a state in which tethering function is not executed in the relay apparatus, and it is temporarily impossible to start the tethering function from outside in accordance with a request by BLE communication. For example, a state in which the link of public network communication has not been established in the relay apparatus, of a state in which the relay apparatus is operating as a station of wireless LAN corresponds to the "inexecutable" state. Additionally, the value of the tethering execution state 860 is invalid in a relay apparatus whose tethering function 840 is "absent".

<4. Processing of Communication Apparatus>

The operation procedure of the communication apparatus (digital camera 1) according to the embodiment of the present invention will be described next with reference to the flowcharts of FIGS. 3 to 7.

[Relay Apparatus Search Processing]

Figure 3:
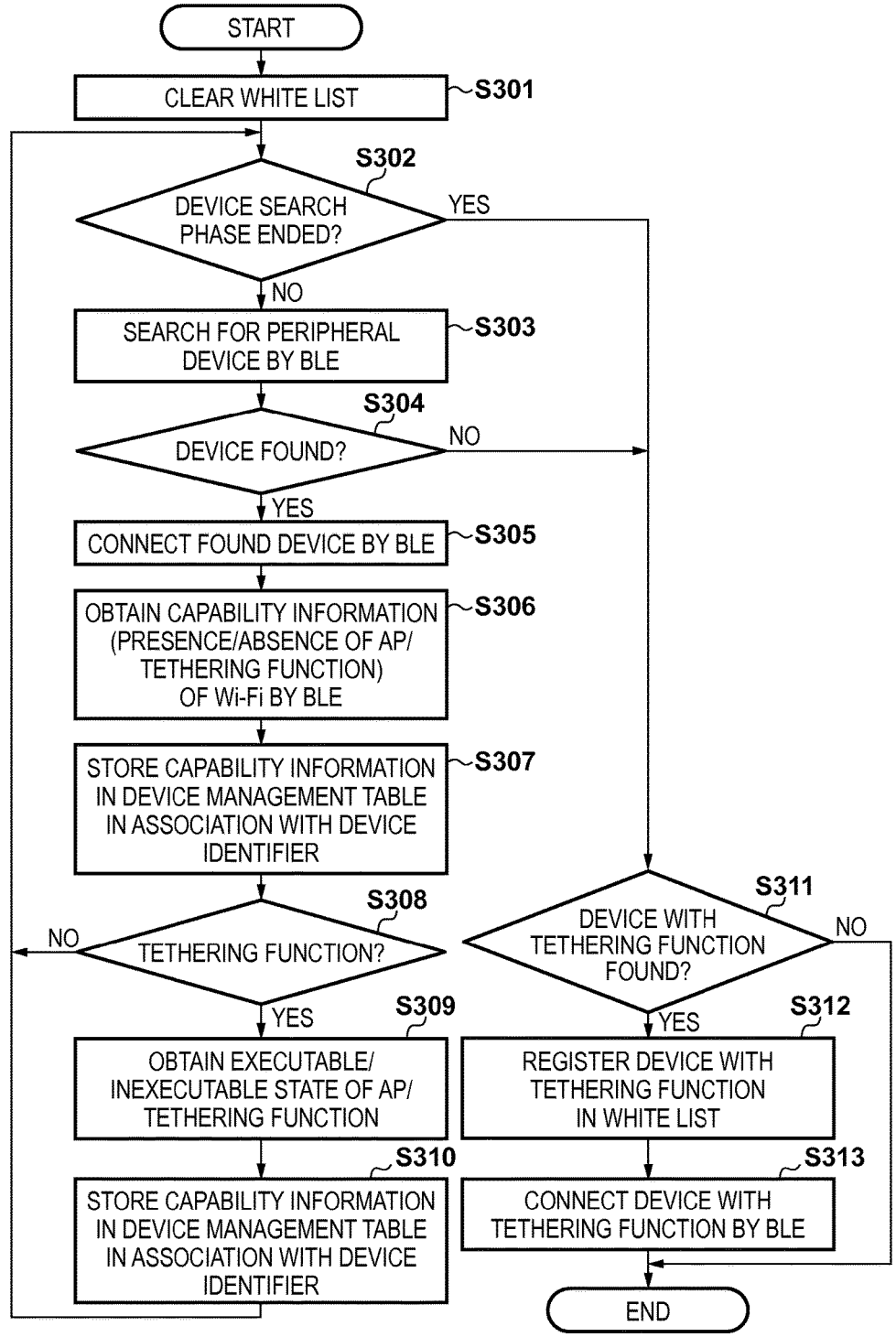
FIG. 3 is a flowchart showing the operation procedure of the communication apparatus (digital camera) according to the embodiment of the present invention.

The flowchart of FIG. 3 shows the operation procedure of the digital camera 1 when searching for a relay apparatus (smartphone) capable of tethering. This processing starts when the user selects a menu displayed on the display unit 100 of the digital camera 1 by operating the operation unit 101. Note that in the present invention, the processing may be executed at another timing. For example, the processing may be executed upon powering on the digital camera 1.

When the processing starts, first, the white list management unit 270 clears the data of the white list stored in the RAM 113 (step S301). Next, the digital camera 1 transits to a relay apparatus search phase (step S302), and the relay apparatus control unit 260 executes relay apparatus search processing by BLE communication (steps S303 to S310). In this embodiment, the relay apparatus search phase is assumed to be executed until a predetermined time elapses, the processing is stopped by a user operation on the operation unit 101, or no more relay apparatus is found by the device search by BLE communication (NO in step S304).

More specifically, in the relay apparatus search phase, using BLE communication by the BLE communication control unit 220, the digital camera 1 searches for a peripheral device capable of BLE communication (step S303). If a peripheral device is found (YES in step S304), the BLE communication control unit 220 connects the digital camera to the found peripheral device by BLE communication (step S305). Note that connection here means connection in Link Layer Level of Bluetooth Low Energy defined by Bluetooth SIG, SPECIFICATION OF THE BLUETOOTH SYSTEM (ver 4.0). Next, using BLE communication by the BLE communication control unit 220, the relay apparatus control unit 260 obtains information (capability information) of the wireless LAN function supported by the peripheral device (step S306). The information of the wireless LAN function obtained here is information managed as the STA function 820, the AP function 830, and the tethering function 840 in the device management table 800. The relay apparatus information management unit 250 saves the information of the wireless LAN function obtained in step S306 in the device management table 800 in association with the identifier of the relay apparatus of interest (step S307). Upon determining based on the wireless LAN function obtained in step S306 that the relay apparatus of interest supports the tethering function (YES in step S308), the relay apparatus control unit 260 obtains the executable/inexecutable states of the AP function and the tethering function from the relay apparatus (step S309). The executable/inexecutable states of the AP function and the tethering function obtained here are information managed as the AP execution state 850 and the tethering execution state 860 in the device management table 800. The pieces of information obtained in step S309 are saved in the record of the device management table 800 which is saved by the relay apparatus information management unit 250 in step S307 (step S310).

When the relay apparatus search phase ends (YES in step S302 or NO in step S304), the digital camera 1 determines whether a relay apparatus that supports the tethering function is found in the search phase (step S311). If a relay apparatus that supports the tethering function is found (YES in step S311), the digital camera 1 causes the white list management unit 270 to register the relay apparatus in the white list (step S312). In addition, the digital camera 1 causes the BLE communication control unit 220 to do connection by BLE communication to one of the found relay apparatuses that support the tethering function (step S313). In this embodiment, the relay apparatus connected in step S313 is assumed to be a relay apparatus selected by a user operation on the operation unit 101 to do a so-called pairing operation of Bluetooth®. Note that a relay apparatus found first or a relay apparatus determined using BLE communication to exist nearest may be connected, or an optimum relay apparatus may be determined by combining a plurality of conditions and connected. As the relay apparatus registered in step S312 as well, only the relay apparatus determined to be connected in step S313, as described above, may be registered, or one or a plurality of relay apparatuses selected by a user operation on the operation unit 101 may be registered. If a relay apparatus that supports the tethering function is not found in the relay apparatus search phase (NO in step S311), the processing ends without performing registration in the white list (step S312) and connection to a relay apparatus (step S313). The series of processes shown in FIG. 3 thus ends.

[Processing when AP State Change Notification Message is Received from Relay Apparatus]

Figure 4:
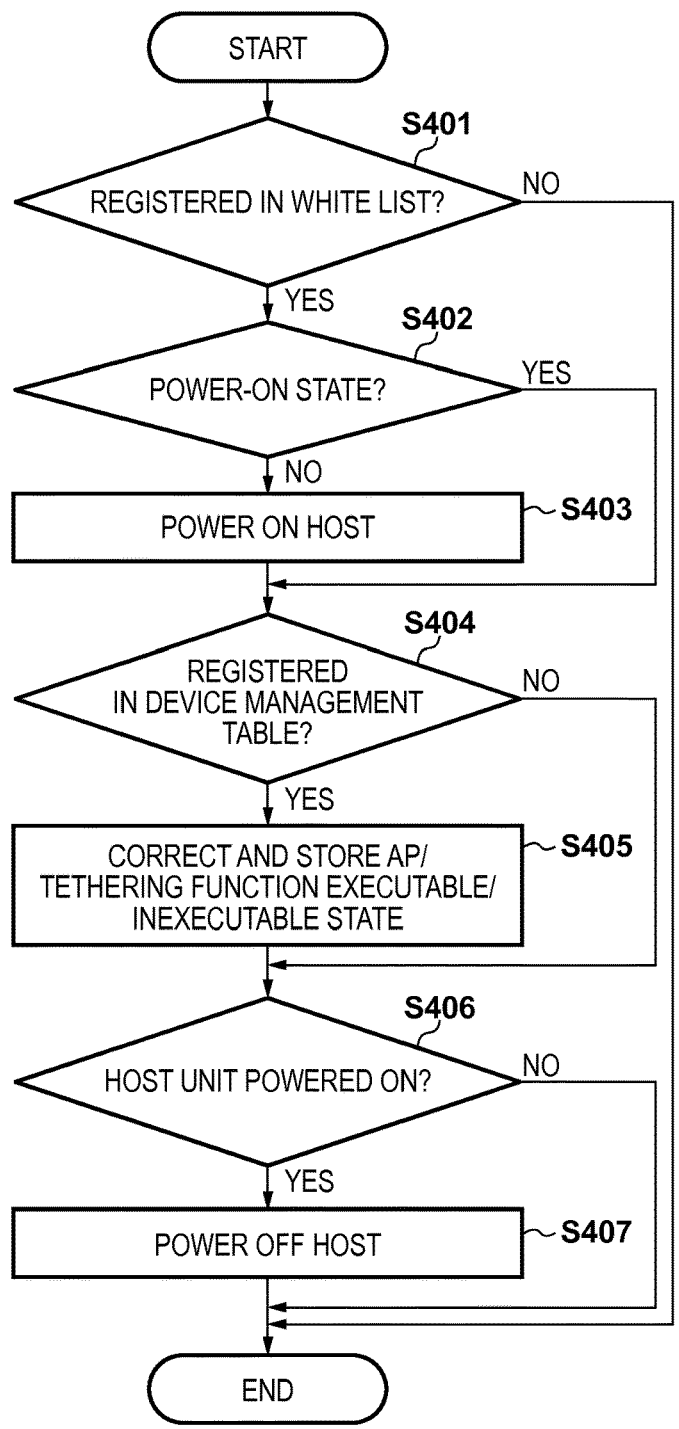
FIG. 4 is a flowchart showing the operation procedure of the communication apparatus (digital camera) according to the embodiment of the present invention.

The flowchart of FIG. 4 shows the operation procedure when the BLE communication control unit 220 of the communication apparatus (digital camera 1) has received an AP state change notification message transmitted from a relay apparatus. The AP state change notification message is a message with which a relay apparatus notifies, via BLE communication, a change in the above-described AP execution state or tethering execution state of the relay apparatus (smartphone). The message is transmitted from the relay apparatus when, for example, wireless LAN communication processing in which the relay apparatus operates as a station of wireless LAN is completed, or public network communication is disconnected.

When the BLE communication control unit 220 receives the AP state change notification message, the digital camera 1 causes the white list management unit 270 to determine whether the message transmission source device is registered in the white list (step S401). If the transmission source device is registered in the white list (or if no device is registered in the white list) (YES in step S401), the power supply control unit 230 that operates in the control unit 114 determines whether the power supply of the Host unit 10 is on or off (step S402). If the power supply of the Host unit 10 is off (NO in step S402), the power supply control unit 230 controls the power supply unit 103 to power on the Host unit 10 (step S403). Next, the relay apparatus information management unit 250 determines whether the message transmission source device is registered in the device management table 800 (step S404). If the device is registered in the device management table 800 (YES in step S404), the relay apparatus information management unit 250 stores the AP execution state or tethering execution state included in the received AP state change notification message in the corresponding record of the device management table 800 (step S405). After the search/correction (update) of the device management table 800 (steps S404 and S405) is completed, processing goes to a step S406. Then, the power supply control unit 230 confirms in step S403 whether the Host unit 10 is powered on (S406). If powered on, the power supply control unit 230 controls the power supply unit 103 to power off the Host unit 10 (step S407).

If the AP state change notification message transmission source device is not registered in the white list (NO in step S401), the BLE communication control unit 220 discards the message, and the processes of steps S402 to S407 are not executed.

[Data Upload Processing by Communication Apparatus]

Figure 5A:
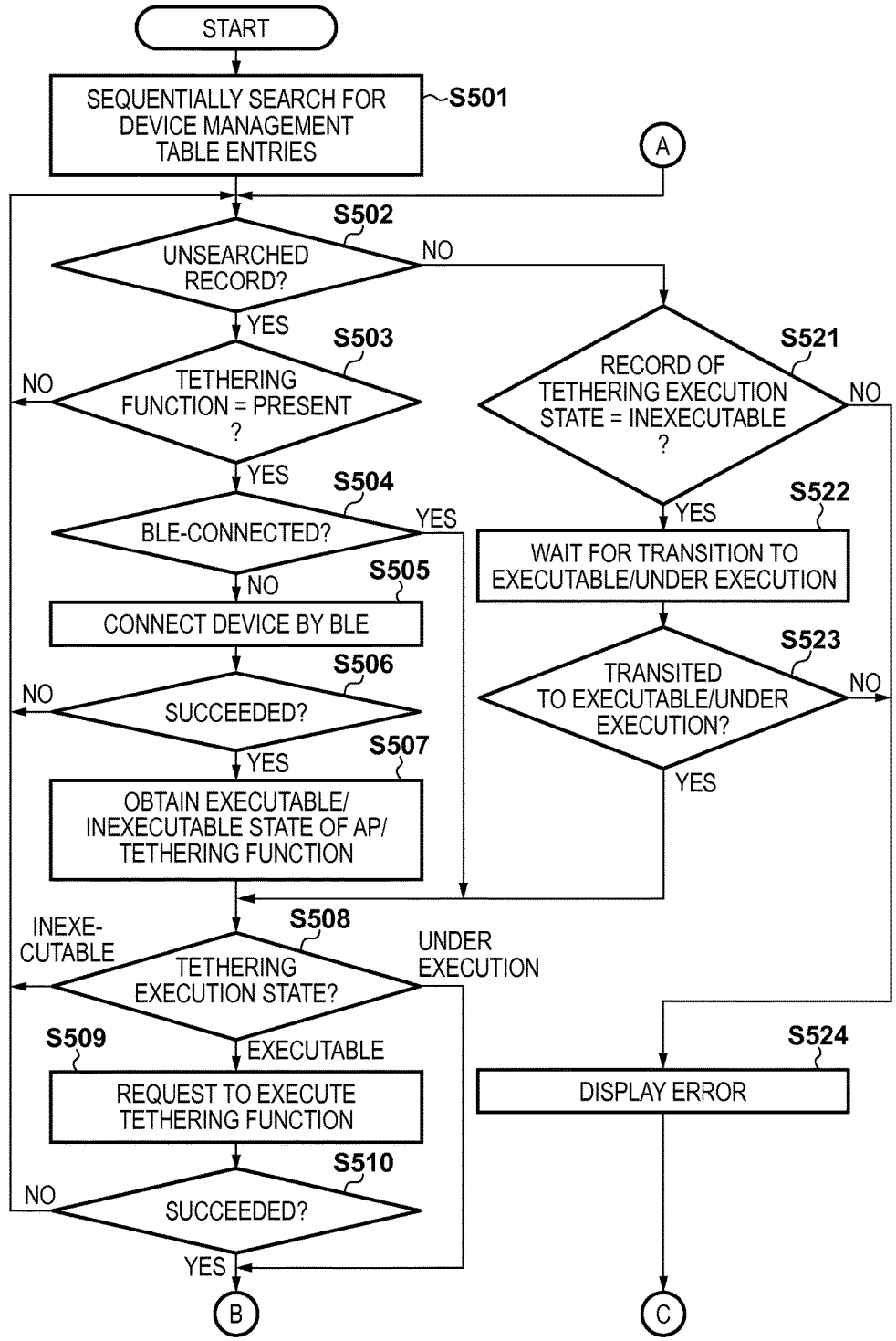
FIGS. 5A and 5B are flowcharts showing the operation procedure of the communication apparatus (digital camera) according to the embodiment of the present invention.
Figure 5B:
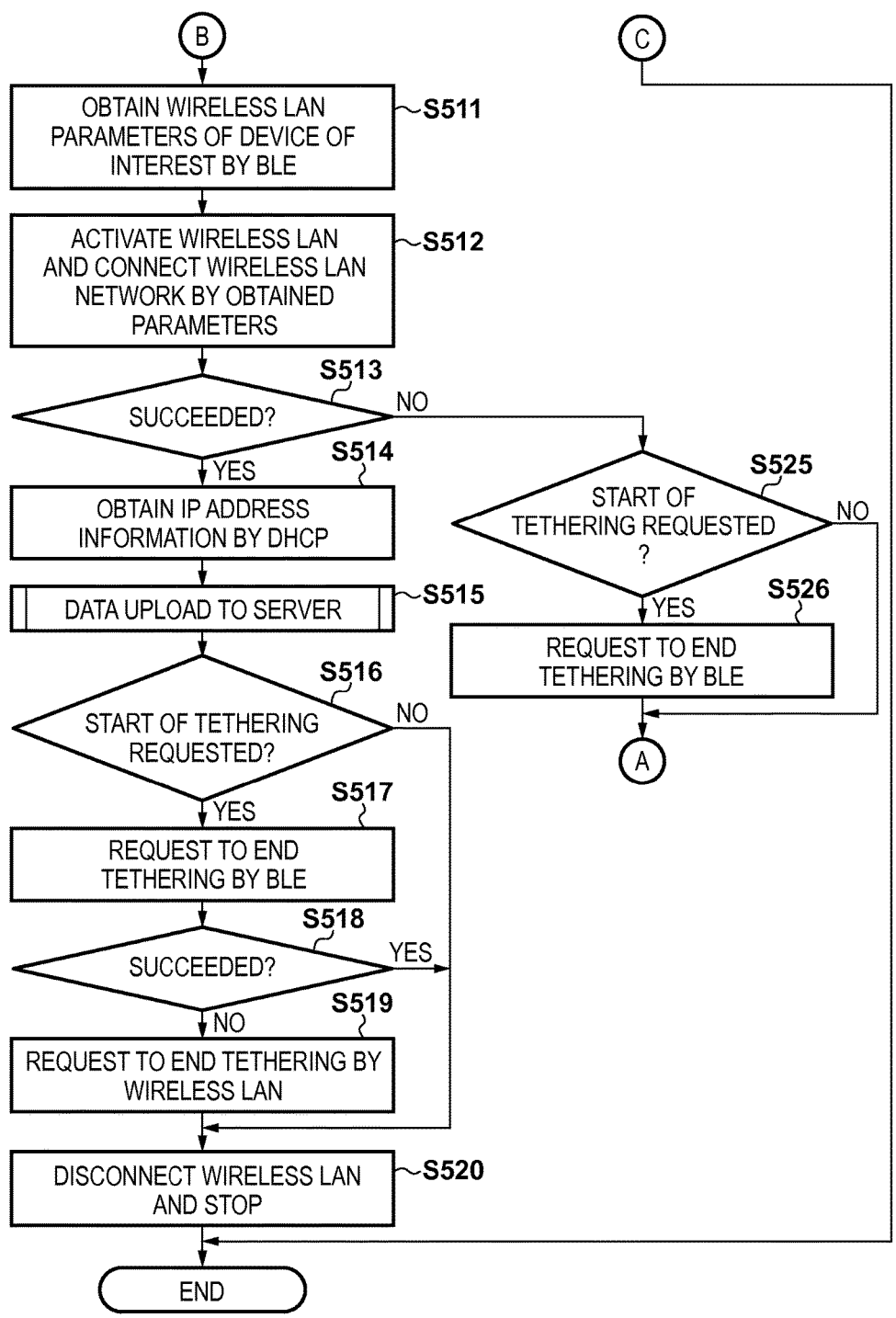

The flowchart of FIGS. 5A and 5B shows the operation procedure when the communication apparatus (digital camera 1) uploads image/video data stored in the storage unit 102 to the external server 940. This processing starts when the user executes an operation of selecting a thumbnail image displayed on the display unit 100 of the digital camera 1 by operating the operation unit 101 and uploading the selected image by similarly operating the operation unit 101. Note that in the present invention, the processing may be executed at another timing. For example, the processing may be executed when the user performs a shooting operation by operating the image capturing unit 105. Alternatively, the processing may be executed when the tethering execution state of the relay apparatus has transited to "executable" as the result of processing shown in FIG. 4.

When the processing starts, the digital camera 1 causes the relay apparatus information management unit 250 to sequentially search the records of the device management table 800 (step S501), thereby searching for a relay apparatus capable of tethering out of one or more relay apparatuses and performing tethering function start request processing (steps S502 to S513). If an unsearched record exists in the device management table 800 (YES in step S502), the relay apparatus information management unit 250 determines whether the relay apparatus of the record has the tethering function (step S503). Here, the relay apparatus information management unit 250 determines the presence/absence of the tethering function by the value of the tethering function 840 in the device management table 800. If the relay apparatus does not have the tethering function (NO in step S503), the relay apparatus is excluded from the target. The process returns to step S502, and the relay apparatus information management unit 250 searches for the next record (step S502). On the other hand, if the relay apparatus has the tethering function (YES in step S503), the relay apparatus control unit 260 determines whether the digital camera is connected to the relay apparatus by BLE communication via the BLE communication control unit 220 (step S504). Note that connection here means connection in Link Layer Level of Bluetooth Low Energy defined by Bluetooth SIG, SPECIFICATION OF THE BLUETOOTH SYSTEM (ver 4.0). If connected by BLE communication (YES in step S504), the digital camera 1 executes processing from step S508 next. If unconnected by BLE communication (NO in step S504), the BLE communication control unit 220 attempts connection to the relay apparatus by BLE communication (step S505). If connection has succeeded (YES in step S506), the relay apparatus control unit 260 obtains, from the relay apparatus, the AP execution state and the tethering execution state of the relay apparatus via the connected BLE link (step S507). If connection to the relay apparatus has failed (NO in step S506), the relay apparatus is excluded from the target, and the relay apparatus information management unit 250 searches for the next record (step S502).

Next, the relay apparatus information management unit 250 determines whether the relay apparatus can execute the tethering function (step S508). Here, the relay apparatus information management unit 250 determines the executable/inexecutable state of the tethering function by the value of the tethering execution state 860 in the device management table 800. If the tethering execution state of the relay apparatus is "under execution" ("under execution" in step S508), the digital camera 1 executes processing from step S511. If the tethering execution state of the relay apparatus is "executable" ("executable" in step S508), the relay apparatus control unit 260 requests the relay apparatus to start the tethering function via BLE communication by the BLE communication control unit 220. If the tethering function has successfully started (YES in step S510), the digital camera 1 executes processing from step S511. If the tethering execution state of the relay apparatus is "inexecutable" ("inexecutable" in step S508), or the tethering function start request in step S509 has failed (NO in step S510), the relay apparatus is excluded from the target, and the relay apparatus information management unit 250 searches for the next record (step S502). When the tethering function starts in the relay apparatus, the relay apparatus control unit 260 obtains parameter information of wireless LAN communication from the relay apparatus via BLE communication by the BLE communication control unit 220 (step S511). The parameter information of wireless LAN communication here includes the parameters of a wireless LAN network generated by the access point of the relay apparatus. More specifically, the parameter information includes information of an SSID (Service Set Identifier), BSSID (Basic Service Set Identifier), encryption type, encryption key, authentication type, wireless channel, and the like. When the parameter information of wireless LAN communication is obtained, the Wi-Fi communication control unit 210 activates the Wi-Fi controller unit 12, and attempts connection to the wireless LAN network identified by the parameters obtained by the parameter obtaining (step S512). If connection to the wireless LAN network has failed (NO in step S513), and the tethering execution request to the relay apparatus has been issued in step S509 (YES in step S525), the relay apparatus control unit 260 requests the relay apparatus to stop the tethering function via BLE communication by the BLE communication control unit 220 (step S526). The relay apparatus is excluded from the target, and the relay apparatus information management unit 250 searches for the next record (step S502).

On the other hand, if connection to the wireless LAN network has succeeded (YES in step S513), the Wi-Fi communication control unit 210 obtains the IP address of the local apparatus, the IP address of the gateway, and the IP address of the DNS server using DHCP (Dynamic Host Configuration Protocol) (step S514). If IP address obtaining is completed, the upload processing unit 240 uploads image/video data to the external server 940 via the connected wireless LAN network (step S515). The upload is executed using a communication protocol, for example, HTTP (Hyper Text Transfer Protocol) or FTP (File Transfer Protocol). After the upload processing is completed, the digital camera 1 attempts to stop the tethering function in the relay apparatus (steps S516 to S519). If the tethering execution request to the relay apparatus has been issued in step S509 (YES in step S516), the relay apparatus control unit 260 requests the relay apparatus to stop the tethering function via BLE communication by the BLE communication control unit 220 (step S517). If the tethering function stop request by BLE communication has failed (NO in step S518), the relay apparatus control unit 260 further requests the relay apparatus to stop the tethering function via wireless LAN communication by the Wi-Fi communication control unit 210 (step S519). If the tethering execution request to the relay apparatus has not been issued in step S509 (NO in step S516), the digital camera 1 does not request the relay apparatus to stop the tethering function (that is, the processes of steps S517 to S519 are not executed). Finally, the Wi-Fi communication control unit 210 disconnects the wireless LAN network and stops the Wi-Fi controller unit 12 to end the processing (step S520).

If the upload processing is not completed even when all records of the device management table 800 have been processed (NO in step S502), the relay apparatus information management unit 250 determines whether a record whose tethering execution state is "inexecutable" exists in the device management table 800 (step S521). If there exists no record with "inexecutable" (NO in step S521), the digital camera 1 displays, on the display unit 100, an error representing that the image upload processing has failed (step S524), and the processing ends. On the other hand, if there exists a record whose tethering execution state is "inexecutable" (YES in step S521), the digital camera 1 waits for transition of the tethering execution state of the record (step S522). More specifically, the digital camera 1 waits for reception of an AP state change notification message transmitted from the relay apparatus indicated by the record and representing that the tethering execution state has transited to "executable" or "under execution". If the tethering execution state has transited to "executable" or "under execution" (YES in step S523), the digital camera 1 executes processing from step S508, and attempts connection to the relay apparatus. On the other hand, if the tethering execution state has not transited to "executable" or "under execution" during the wait period (NO in step S523), the digital camera 1 displays, on the display unit 100, an error representing that the image upload processing has failed (step S524), and the processing ends.

[Processing in Power-on/Off Operation of Communication Apparatus]

Figure 6:
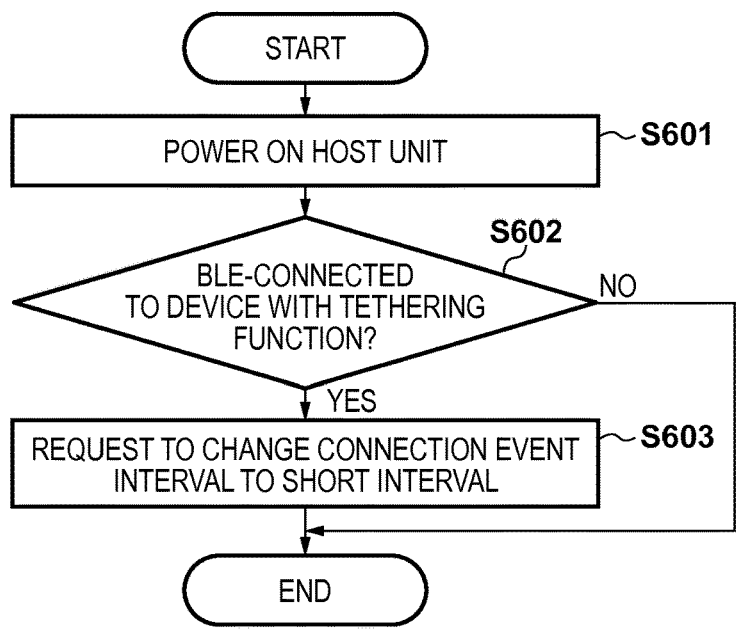
FIG. 6 is a flowchart showing the operation procedure of the communication apparatus (digital camera) according to the embodiment of the present invention.
Figure 7:
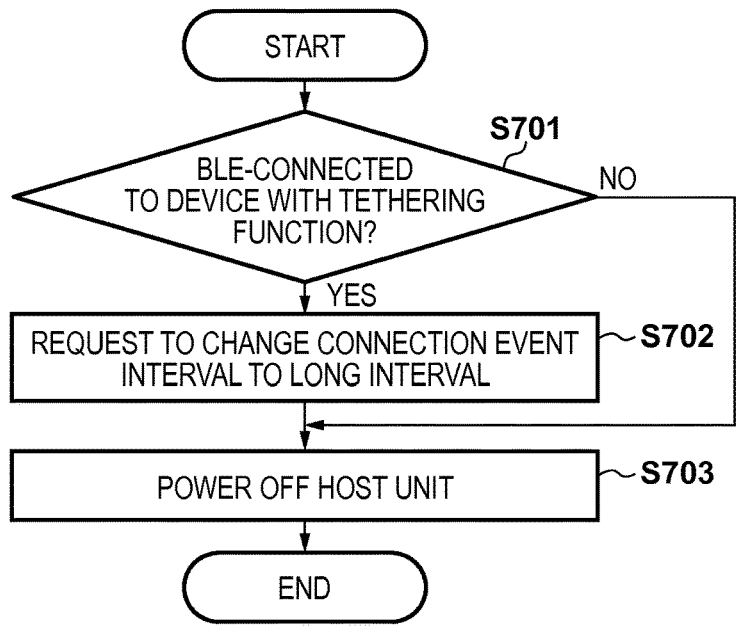
FIG. 7 is a flowchart showing the operation procedure of the communication apparatus (digital camera) according to the embodiment of the present invention.

FIGS. 6 and 7 show the operation procedure when performing the power-on/off operation of the digital camera 1.

As shown in FIG. 6, when the user operates the operation unit 101 to perform the power-on operation of the digital camera 1, the digital camera 1 causes the power supply unit 103 to start power supply to the Host unit 10 (step S601). Next, the relay apparatus information management unit 250 determines whether the digital camera is connected to a relay apparatus having the tethering function by BLE via the BLE communication control unit 220 (step S602). If the digital camera is connected to the relay apparatus (YES in step S602), the BLE communication control unit 220 transmits, to the relay apparatus, a message to request to shorten the connection event interval of BLE (step S603).

As shown in FIG. 7, when the user operates the operation unit 101 to perform the power-off operation of the digital camera 1, the relay apparatus information management unit 250 determines whether the digital camera is connected to a relay apparatus having the tethering function by BLE via the BLE communication control unit 220 (step S701). If the digital camera is connected to the relay apparatus (YES in step S701), the BLE communication control unit 220 transmits, to the relay apparatus, a message to request to prolong the connection event interval of BLE (step S702). Finally, the digital camera 1 causes the power supply unit 103 to stop power supply to the Host unit 10 (step S703), and changes to a power-off state. Even in the power-off state, power supply from the power supply unit 111 of the BLE controller unit 11 continues in the digital camera 1. Hence, after the user performs the power-off operation, the digital camera 1 can continue communication by BLE. As a result of BLE communication, the Host unit 10 may be powered on by the power supply control unit 230 that operates in the BLE controller unit 11.

The above-described connection event interval is the transmission interval of a communication packet and, more specifically, Connection Interval defined by "Link Layer Specification" defined by Bluetooth SIG, SPECIFICATION OF THE BLUETOOTH SYSTEM (ver 4.0). The connection event represents a timing at which transmission of a communication packet can be started on the BLE connection. Connection Interval is a time interval determined between devices that directly communicate by BLE, and is represented by a value designated within the range of 7.5 msec to 4 sec. A device that performs BLE communication performs communication by changing (hopping) the frequency channel to do communication for every timing of each connection event.

Shortening the connection event interval brings the advantage of shortening the reaction time when starting BLE communication according to some event. As a disadvantage, power consumption increases. For example, in this embodiment, a change request to change the connection event interval to a short interval is issued when the user performs the power-on operation of the digital camera 1, and the interval is changed to a long interval according to the power-off operation. With this arrangement, in a state in which the user operates the digital camera 1 to control the tethering function of a relay apparatus (for example, the upload state shown in FIGS. 5A and 5B), response performance is improved. In a state in which the user does not operate the digital camera 1, power consumption is reduced. Note that in the present invention, changing the connection event interval is not essential. In addition, the connection event interval may be changed at a timing other than the power-on/off operation. For example, the connection event interval may be changed to a short interval at a timing when the user operates the operation unit 101 of the digital camera 1 to do a menu operation for image upload processing. Alternatively, the connection event interval may be changed to a short interval when the tethering execution state is changed to "executable" by the above-described AP state change notification message, and to a long interval when the tethering execution state is changed to "inexecutable".

[Communication Sequence Between Communication Apparatus and Relay Apparatus]

Figure 10A:
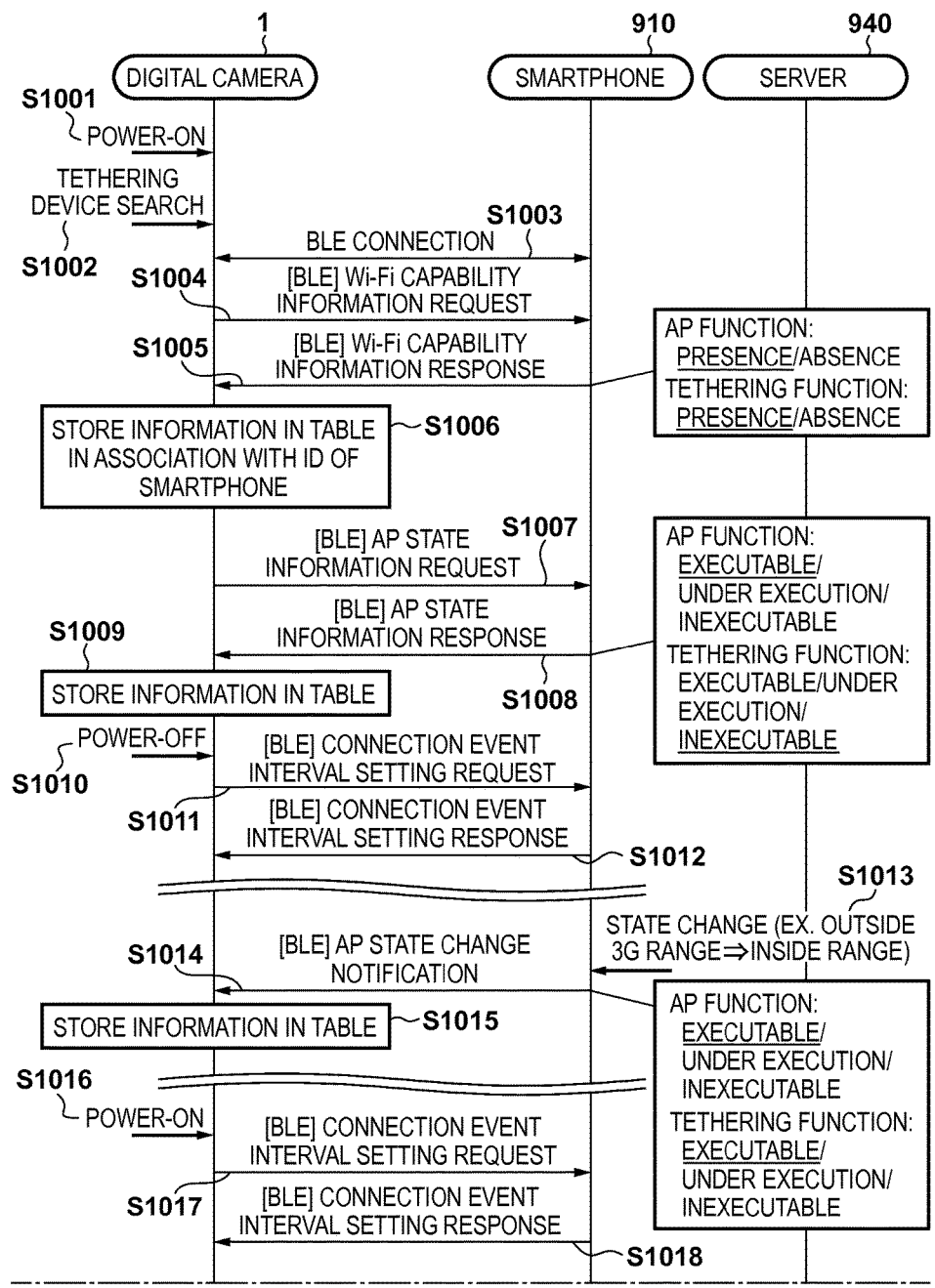

An example of the communication sequence between the digital camera 1 that is a communication apparatus and the smartphone 910 that is a relay apparatus will be described next in detail with reference to FIGS. 10A and 10B.

First, the user performs the power-on operation of the digital camera 1 (step S1001). After that, when the user operates the digital camera 1 and executes an operation of starting tethering device search processing (step S1002), the digital camera 1 searches for a peripheral device by BLE communication, finds the smartphone 910, and performs connection by BLE (step S1003). On the BLE connection, the digital camera 1 requests the capability information of wireless LAN (information of the wireless LAN function) of the smartphone 910 (step S1004). Upon receiving the request, the smartphone 910 returns its capability information of wireless LAN to the digital camera 1 (step S1005). In step S1005, the smartphone 910 returns a response representing that it has the AP function and the tethering function. Upon receiving the response of step S1005, the digital camera 1 stores information representing that the smartphone 910 has the AP function and the tethering function in the device management table 800 in association with the identifier of the smartphone 910 (step S1006).

Next, the digital camera 1 requests the smartphone 910 to obtain the execution states of the AP function and the tethering function (step S1007). Upon receiving the request, the smartphone 910 returns the executable/inexecutable information of the AP function and the tethering function of its own to the digital camera 1 (step S1008). Here, the smartphone 910 is assumed to be outside the range of the public network communication 960 and return a response representing that the AP function is executable, and the tethering function is inexecutable. Upon receiving the response of step S1008, the digital camera 1 stores the AP execution state and the tethering execution state of the smartphone 910 in the device management table 800 (step S1009). After that, when the user performs the power-off operation of the digital camera 1 (step S1010), the digital camera 1 transmits a request message to change the connection event interval of BLE communication to a long interval to the smartphone by BLE communication (step S1011). The smartphone 910 changes the connection event interval of BLE communication to a long interval, and transmits a response message to the digital camera 1 (step S1012). At this point of time, BLE communication between the digital camera 1 and the smartphone 910 still remains connected, and the BLE controller unit 11 of the digital camera 1 continues the operation by power supply from the power supply unit 111.

When moving into the range of the public network communication (step S1013), the smartphone 910 transmits an AP state change notification message representing that the AP function and the tethering function are executable to the digital camera 1 by BLE communication (step S1014). The digital camera 1 stores information representing that the tethering execution state of the smartphone 910 has changed to "executable" in the device management table 800 (step S1015).

After that, when the user performs the power-on operation again (step S1016), the digital camera 1 transmits a request message to change the connection event interval of BLE communication to a short interval to the smartphone 910 by BLE communication (step S1017). The smartphone 910 changes the connection event interval of BLE communication to a short interval, and transmits a response message to the digital camera 1 (step S1018).

When the user selects an image and executes an image upload operation on the digital camera 1 (step S1019), the digital camera 1 transmits a message to request to execute the AP function and the tethering function to the smartphone 910 by BLE communication (step S1020). Upon receiving the request of step S1020, the smartphone 910 executes the AP function and the tethering function (step S1021), and transmits a message including the execution result to the digital camera 1 (step S1022). Here, assume that the AP function and the tethering function are successfully executed. Upon receiving the message of step S1022, the digital camera 1 transmits a message to request the parameters of the wireless LAN network generated by the smartphone 910 to the smartphone 910 by BLE communication (step S1023). The smartphone 910 transmits a response message including the AP function execution state, tethering function execution state, and information of SSID, BSSID, encryption type, authentication type, and encryption key to the digital camera 1 (step S1024). The digital camera 1 activates the wireless LAN function (step S1025), and is connected to the smartphone 910 by wireless LAN using the parameters of the wireless LAN network obtained in step S1024 (step S1026).

When wireless LAN connection has succeeded, the digital camera 1 obtains the IP address of its own, the IP address of the gateway, and the IP address of the DNS server for the smartphone 910 using the connected wireless LAN communication (step S1027). After that, the digital camera 1 is connected to the external server 940 via the smartphone 910 using the obtained IP addresses, and the user uploads the image data selected in step S1019 to the external server 940 (step S1028).

When the image upload processing is completed (step S1029), the digital camera 1 transmits, to the smartphone 910, a message to request to stop the AP function and the tethering function by BLE communication (step S1030). Upon receiving the request of step S1030, the smartphone 910 stops the AP function and the tethering function (step S1031), and transmits a message including the execution result to the digital camera 1 (step S1032). Here, assume that the AP function and the tethering function are successfully stopped. Upon receiving the message of step S1032, the digital camera 1 executes wireless LAN disconnection processing (step S1033), and stops the wireless LAN function of its own (step S1034).

An embodiment of the present invention has been described above. The present invention is not limited to the embodiments shown in the specifications and drawings, and various changes and modifications can be made without departing from the scope of the present invention.

Note that in this embodiment, an example has been described in which the digital camera 1 obtains, via BLE communication, the setting information of the wireless LAN network generated by the smartphone 910 and is connected to the wireless LAN network (for example, steps S511 and S512 of FIG. 5B). However, the present invention is not limited to this. The digital camera 1 may designate the setting information of the wireless LAN network for the smartphone 910 via BLE communication and then be connected to the wireless LAN network. In this case, the smartphone 910 generates the wireless LAN network by the access point function using the wireless LAN network information notified from the digital camera 1, and executes the tethering function between the network and the public network communication.

In the above embodiment, BLE has been exemplified. However, communication may be performed using another communication unit. For example, communication complying with a communication standard such as Zigbee®, RF4CE (Radio Frequency for Consumer Electronics), or Wireless USB may be performed.

Similarly, in this embodiment, the public network communication has been exemplified as one communication unit, and the wireless LAN has been exemplified as the other communication unit. However, communication may be performed using other communication units. For example, wireless LAN may be used in place of the public network communication, and Bluetooth® 3.0 may be used in place of the wireless LAN. That is, it is only necessary to connect the external server by one communication unit and allow the relay apparatus to relay the communication between the one communication unit and the other communication unit.

Although the above description does not make any mention of radio wave output in BLE communication, the radio wave output in BLE communication may be changed in synchronism with each of the above-described processes. For example, when performing search processing shown in FIG. 3 to search for a relay apparatus in close vicinity, the radio wave output in BLE communication may be lowered. Alternatively, to reliably perform image upload processing, the radio wave output may be raised at the time of BLE communication shown in FIGS. 5A and 5B.

In the above description, as the method of changing the connection event interval, the digital camera 1 transmits a request message to the smartphone 910. However, another method may be used. For example, the interval may be changed by a one-way notification message from the digital camera 1 to the smartphone 910. Alternatively, the user may operate the smartphone 910 so as to cause it to transmit a connection event interval change request message to the digital camera 1, and the digital camera 1 may comply with this request.

In the above description, the digital camera 1 has been exemplified as a communication apparatus that implements the present invention. However, a communication apparatus other than the digital camera may implement the present invention. For example, a communication apparatus that includes a plurality of communication interfaces for communicating with an external relay apparatus and communicates with the external server via the relay apparatus is usable.

When the communication apparatus is connected to the relay apparatus by wireless LAN, BLE may be disconnected. In this case, if the wireless LAN is disconnected, the BLE is connected again. This can further lower power consumption of the communication apparatus.

As described above, according to the embodiment, it is possible to activate the tethering function of the smartphone 910 from the digital camera 1 by BLE communication and perform communication with the external server 940 via the smartphone 910. At this time, the executable/inexecutable state of the tethering function of the smartphone 910 is determined, thereby reducing the possibility that the digital camera 1 is connected, by BLE communication or wireless LAN communication, to the smartphone 910 incapable of executing the tethering function.

It is therefore possible to reduce power consumption of the digital camera 1 and the smartphone 910, and also shorten the time from a user operation to connection to the external server 940 and improve the usability.

As described above, when the communication apparatus that uses the relay function of an external relay apparatus requests an appropriate external relay apparatus to start the relay function and is connected to an external network, unnecessary communication traffic can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-177431, filed Sep. 1, 2014, which is hereby incorporated by reference wherein in its entirety.

What is claimed is:

1. A communication apparatus comprising:
   one or more processors; and
   one or more memories including instructions that, when executed by the one or more processors, cause the apparatus to:
   obtain, by a communication that conforms to a first communication scheme, execution information representing whether or not a first apparatus is executing a relay function that enables the communication apparatus to communicate with a second apparatus via the first apparatus;
   request, by the communication that conforms to the first communication scheme, the first apparatus to start the relay function, in a case where the execution information represents that the first apparatus is not executing the relay function;
   communicate with the second apparatus via the first apparatus, by performing a communication that conforms to a second communication scheme that is different from the first communication scheme with the first apparatus that is executing the relay function;
   determine whether the first apparatus has been requested to start the relay function in a case where the communication with the second apparatus is terminated; and
   request the first apparatus to stop the relay function in a case where it is determined that the first apparatus has been requested to start the relay function, and not request the first apparatus to stop the relay function in a case where it is determined that the first apparatus has not been requested to start the relay function.

2. The apparatus according to claim 1, wherein the processors execute the instructions to connect to a wireless network so that the communication apparatus communicates with the second apparatus via the first apparatus.

3. The apparatus according to claim 2, wherein the processors execute the instructions to obtain parameter information of the network, and
   to connect to the wireless network using the parameter information.

4. The apparatus according to claim 1, wherein the processors execute instructions to request the first apparatus to change a transmission interval of the execution information from the first apparatus based on a user operation on the communication apparatus.

5. The apparatus according to claim 4, wherein the processors execute instructions to make the transmission interval shorter in a case where the user operation is a power-on operation of the communication apparatus than when the user operation is a power-off operation of the communication apparatus.

6. The apparatus according to claim 1, wherein the first communication scheme is a communication scheme by Bluetooth low energy and the second communication scheme is a communication scheme certified by Wi-Fi.

7. The apparatus according to claim 1, wherein the communication apparatus requests to terminate the relay function by the first communication scheme.

8. A control method of a communication apparatus, comprising:
   an obtaining step of obtaining, by a communication that conforms to a first communication scheme, execution information representing whether or not a first apparatus is executing a relay function that enables the communication apparatus to communicate with a second apparatus via the first apparatus;
   a requesting step of requesting, by the communication that conforms to the first communication scheme, the first apparatus to start the relay function, in a case where the execution information represents that the first apparatus is not executing the relay function;
   a communicating step of communicating with the second apparatus via the first apparatus, by performing a communication that conforms to a second communication scheme that is different from the first communication scheme with the first apparatus that is executing the relay function;
   a determining step of determining whether the first apparatus has been requested to start the relay function, in a case where the communication with the second apparatus is terminated; and
   a requesting step of requesting the first apparatus to stop the relay function in a case where it is determined that the first apparatus has been requested to start the relay function, and not requesting the first apparatus to stop the relay function in a case where it is determined that the first apparatus has not been requested to start the relay function.

9. A non-transitory computer-readable storage medium storing a computer program for causing a computer to execute a control method of a communication apparatus, comprising:
   obtaining, by a communication that conforms to a first communication scheme, execution information representing whether or not a first apparatus is executing a relay function that enables the communication apparatus to communicate with a second apparatus via the first apparatus;
   requesting, by the communication that conforms to the first communication scheme, the first apparatus to start the relay function, in a case where the execution information represents that the first apparatus is not executing the relay function;
   communicating with the second apparatus via the first apparatus, by performing a communication that conforms to a second communication scheme that is different from the first communication scheme with the first apparatus that is executing the relay function;
   determining whether the first apparatus has been requested to start the relay function, in a case where the communication with the second apparatus is terminated; and
   requesting the first apparatus to stop the relay function in a case where it is determined that the first apparatus has been requested to start the relay function, and not requesting the first apparatus to stop the relay function in a case where it is determined that the first apparatus has not been requested to start the relay function.

* * * * *